United States Patent
Burns et al.

(10) Patent No.: US 8,936,274 B2
(45) Date of Patent: Jan. 20, 2015

(54) LOCKING DEVICE FOR STEERING COLUMN

(75) Inventors: Kevin M. Burns, Montrose, MI (US); Melvin L. Tinnin, Clio, MI (US); John Schulz, Hemlock, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 330 days.

(21) Appl. No.: 13/468,487

(22) Filed: May 10, 2012

(65) Prior Publication Data

US 2013/0298717 A1 Nov. 14, 2013

(51) Int. Cl.
*B62D 1/18* (2006.01)
*B62D 1/184* (2006.01)
*B60R 25/021* (2013.01)

(52) U.S. Cl.
CPC ............ *B62D 1/184* (2013.01); *B60R 25/0211* (2013.01)
USPC ................ 280/775; 280/776; 74/493; 74/510

(58) Field of Classification Search
USPC ......... 74/493, 501.5, 510; 280/775, 776, 777, 280/779
See application file for complete search history.

(56) References Cited

U.S. PATENT DOCUMENTS

| | | | |
|---|---|---|---|
| 4,723,461 A * | 2/1988 | Yoshida et al. | 74/493 |
| 4,793,204 A * | 12/1988 | Kubasiak | 74/493 |
| 2002/0171235 A1 * | 11/2002 | Riefe et al. | 280/775 |
| 2004/0237695 A1 * | 12/2004 | Sato | 74/493 |
| 2008/0143092 A1 * | 6/2008 | Menjak et al. | 280/775 |
| 2008/0236325 A1 * | 10/2008 | Ridgway et al. | 74/493 |
| 2010/0275721 A1 * | 11/2010 | Davies et al. | 74/493 |
| 2011/0041642 A1 * | 2/2011 | Havlicek | 74/493 |

* cited by examiner

*Primary Examiner* — Paul N Dickson
*Assistant Examiner* — Darlene P Condra
(74) *Attorney, Agent, or Firm* — Cantor Colburn LLP

(57) ABSTRACT

A locking device for a steering column and method of installing the locking device are provided. The locking device includes a spring body configured for installation on a rotatable bolt and comprising a biasing portion. The spring body is rotatable in one direction through a first range and second range. A lock body includes a body portion configured for mounting on the rotatable bolt and a locking portion configured to move between a first position and a second position. The biasing portion of the spring body contacts the lock body and causes the lock body to rotate with the spring body through the first range. The spring body is rotatable relative to the lock body through the second range such that at least a portion of the biasing portion is elastically deflected when the spring body is rotated through the second range.

18 Claims, 3 Drawing Sheets

LOCKING DEVICE FOR STEERING COLUMN

BACKGROUND OF THE INVENTION

The following description relates to a locking device, and in particular, a locking device for a steering column.

Locking devices may be used to prevent movement or adjustment of a component relative other components. For example, a locking device may be used to prevent movement or adjustment of a steering column relative to adjacent components once the steering column is adjusted to a desired position.

In some locking devices, a locking part of the device may be moved into locking engagement with an adjacent locking part to prevent movement or adjustment of the component. For example, a locking part and adjacent locking part may both include locking teeth. To lock the component against movement or adjustment, the locking teeth of the locking part are moved into engagement between the locking teeth of the adjacent locking part. To allow for movement or adjustment, the locking teeth of the locking part are removed from engagement between the locking teeth of the adjacent locking part. However, the component may be positioned such that the locking teeth of the locking part are not aligned to fit between the locking teeth of the adjacent locking part. As a result, the locking teeth of the locking part are brought into contact with peak areas of the locking teeth of the adjacent locking part when a user attempts to lock the component against movement or adjustment. Because the locking teeth of the locking part are not received between the locking teeth of the adjacent locking part, a locking engagement is not formed and the component remains in an unlocked state.

In addition, installation of locking devices typically requires the use of a latch to fasten the locking device in a desired location, for example, at a certain position along a shaft or bolt. However, the use of a latch adds complexity to the design of the locking device and requires additional manufacturing and installation steps.

Accordingly, it is desirable to provide a locking device that is preloaded for variable positioning and suitable for latch-free installation.

SUMMARY OF THE INVENTION

According to one general aspect, there is provided a locking device for a steering column including a spring body configured for installation on a rotatable bolt, the spring body includes a biasing portion and is rotatable in one direction through a first range and second range. The locking device also includes a lock body including a body portion configured for mounting on the rotatable bolt and a locking portion configured to move between a first position and a second position, the biasing portion of the spring body contacting the lock body and causing the lock body to rotate with the spring body through the first range, and the spring body rotatable relative to the lock body through the second range, such that at least a portion of the biasing portion is elastically deflected when the spring body is rotated through the second range.

According to another general aspect, there is provided a locking device for a steering column assembly. The locking device includes a spring body having a connecting flange, a first wing including a first opening and connected to one side of the connecting flange, and a second wing including a second opening, the second connected to another side of the connecting flange, opposite to the one side. The first wing and second wing are elastically deflectable in response to application of an external force to the respective wings. The spring body also includes a biasing portion extending from the connecting flange, the biasing portion including a tongue portion and pressing portion. The locking device also includes a lock body disposed at least partially between the first wing and second wing, the lock body including a body portion having an opening formed therein, the opening is aligned with the first opening and second opening. The lock body also includes a locking portion connected to the body portion, the locking portion having a plurality of locking teeth formed on one surface thereof, the pressing portion contacting another surface of the locking portion during rotation of the of the locking device in at least one direction.

According to another general aspect, there is provided an adjustable steering column assembly including a steering column adjustable in at least a telescoping direction, a rotatable bolt positioned adjacent to the steering column, a locking device installed on the rotatable bolt, and a corresponding locking component positioned adjacent to the steering column. The locking device includes a spring body rotatable with the bolt through a first range and second range, the spring body comprising an installation portion including at least one opening keyed to the bolt and a biasing portion connected to the installation portion, at least a portion of the biasing portion being elastically deflectable. The locking device further includes a lock body positioned adjacent to the installation portion, the lock body including a body portion including an opening through which the bolt is received and a locking portion configured to engage the corresponding locking component to lock the steering column against adjustment, and disengage the corresponding locking component to allow for adjustment of the steering column. The lock body rotates with the spring body through the first range due to contact between the lock body and biasing portion, and the portion of the biasing portion is elastically deflected during rotation through the second range such that the spring body rotates relative to the to the lock body through the second range.

According to still another aspect, there is provided a method of installing a locking device in a steering column, the locking device including a spring body and a lock body, the spring body comprising a first wing with an opening, a second wing with an opening, and a connecting flange connected to the first wing and second wing and spacing the first wing from the second wing. The lock body comprises a mounting portion having an opening extending therethrough and a locking portion. The method includes positioning the lock body between the first wing and second wing, aligning the opening of the mounting portion with the openings of the first and second wings, applying a first force to the first wing to elastically deflect the first wing to a first installation position and applying a second force to the second wing to elastically deflect the second wing to a second installation position. The method further includes positioning the spring body and lock body such that a bolt is received in the opening of the mounting portion of the lock body and the respective openings of the first and second wings, moving the spring body and lock body along the bolt to a desired position and releasing the first and second forces from the first wing and second wing respectively.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
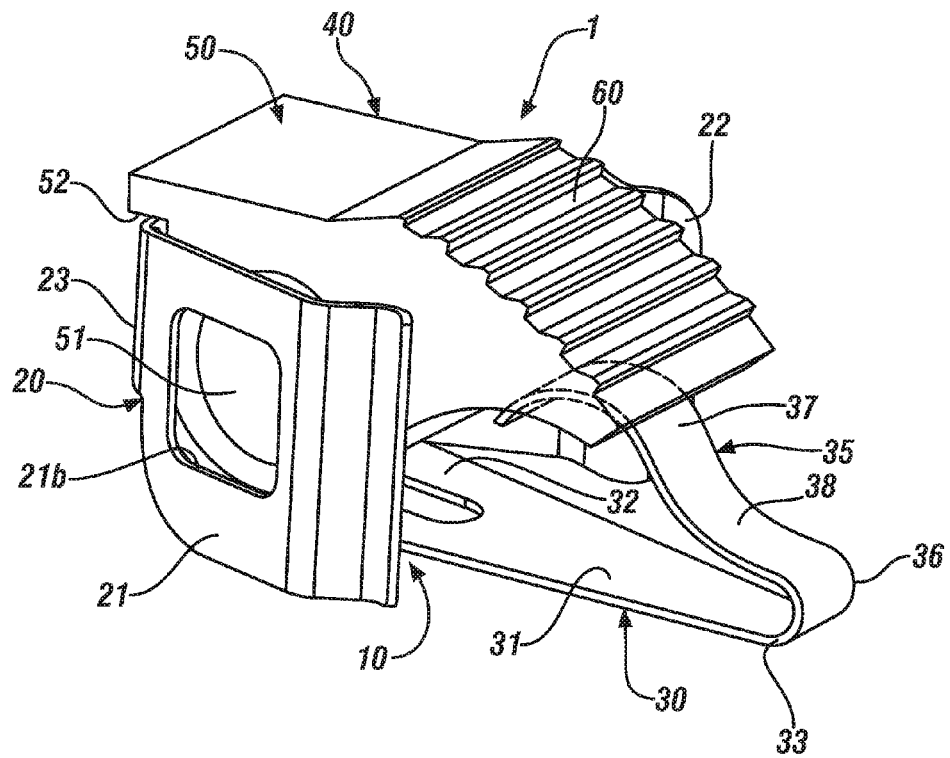
FIG. 1 is a perspective view of a locking device according to an exemplary embodiment.
Figure 2:
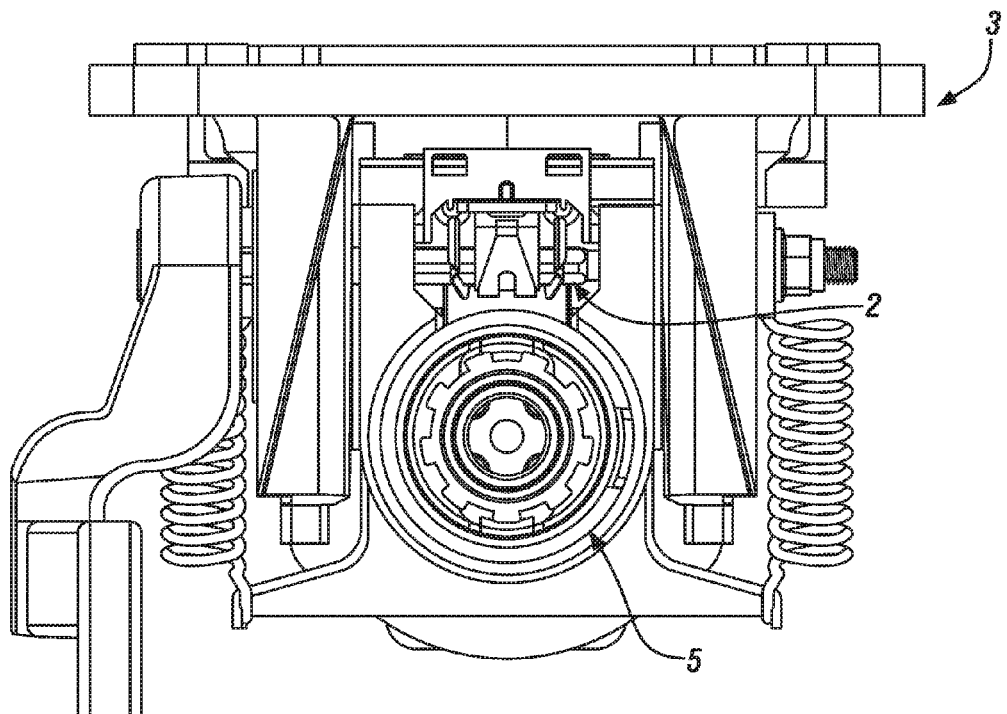
FIG. 2 illustrates a locking device installed in a steering column assembly according to an exemplary embodiment.

Referring now to the Figures, where the invention will be described with reference to specific embodiments, without limiting same, FIGS. 1 and 2 illustrate an exemplary embodiment of a locking device 1 configured to be installed on a bolt 2 in a steering column assembly 3.

Figure 3:
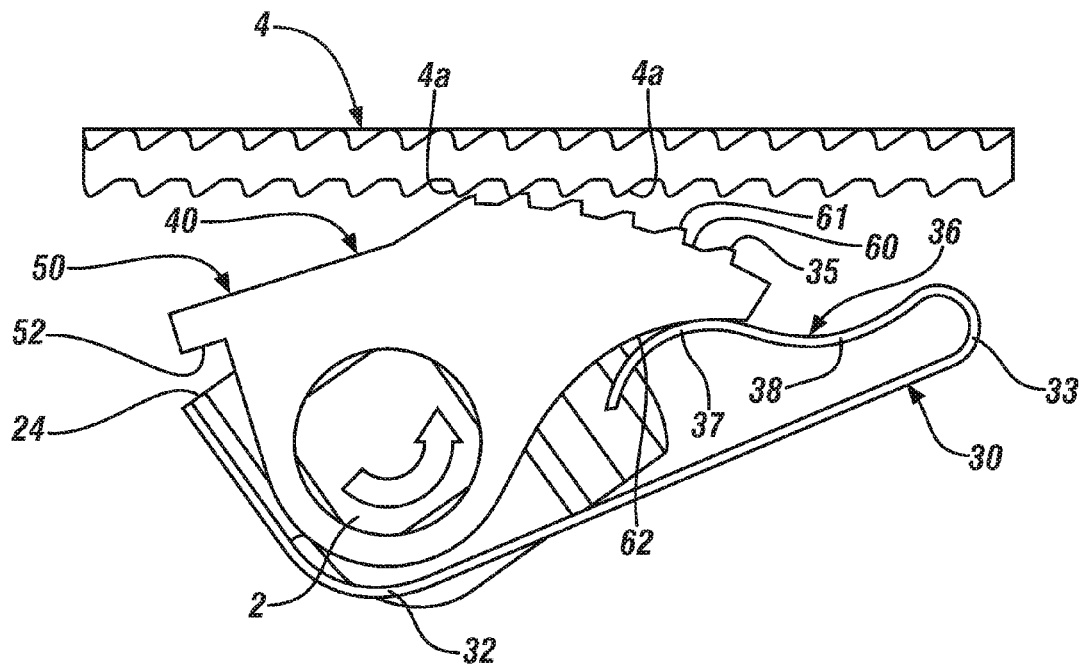
FIG. 3 illustrates a locking device moving toward a locking engagement with a corresponding locking component according to an exemplary embodiment.
Figure 4:
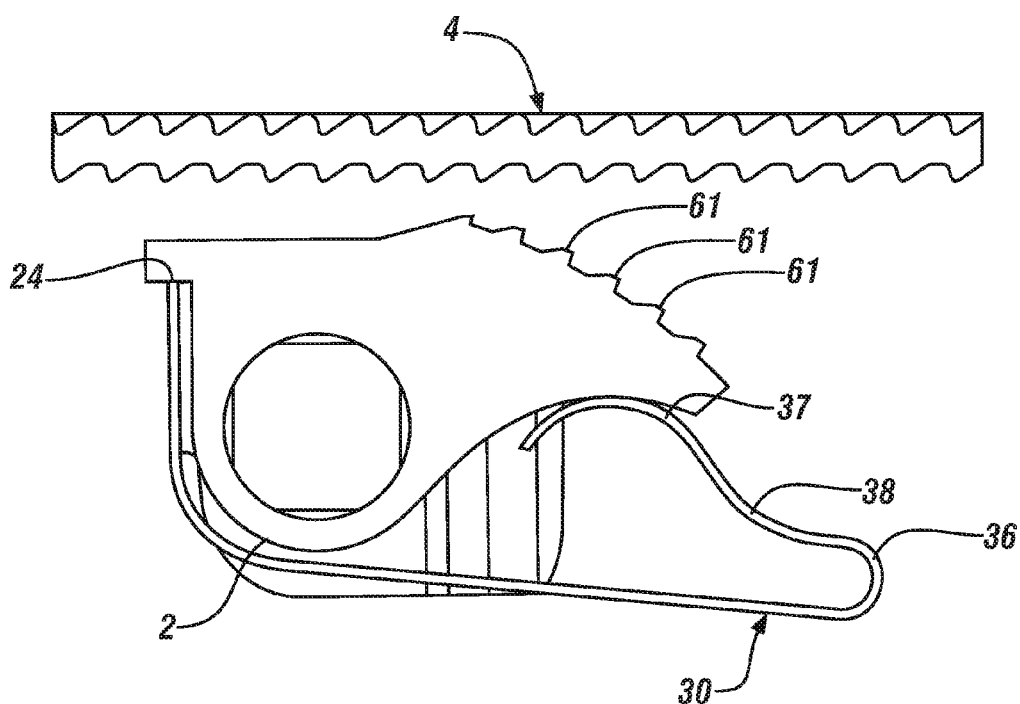
FIG. 4 illustrates a locking device out of locking engagement with a corresponding locking component according to an exemplary embodiment.

With reference to FIGS. 1-4, in an exemplary embodiment, the locking device 1 includes a spring body 10 and a lock body 40. The spring body 10 and lock body 40 are configured to be installed on a rotating bolt 2 in steering column assembly 3 as shown in FIG. 2. Once installed, the spring body 10 is configured to rotate with the bolt 2. As shown in FIGS. 3-4, rotation of the bolt 2 moves the locking device 1 into and out of locking engagement with a component 4 of the steering column assembly 3. In an exemplary embodiment, the component 4 of steering column assembly 3 is an energy absorbing (EA) strap. However, the EA strap is described for the purposes of example only, and other suitable components may be used.

The locking device 1 may be used to lock an adjustable steering column against telescopic adjustment while in a locked position and allow for telescopic adjustment while in an unlocked position.

In general, the spring body 10 includes an attaching portion 20 and a biasing portion 30. The attaching portion 20 is configured to attach the spring body 10 to the bolt 2 of the steering column assembly 3. The biasing portion 30 is configured to urge a portion of the lock body 40 toward a predetermined position.

Figure 5:
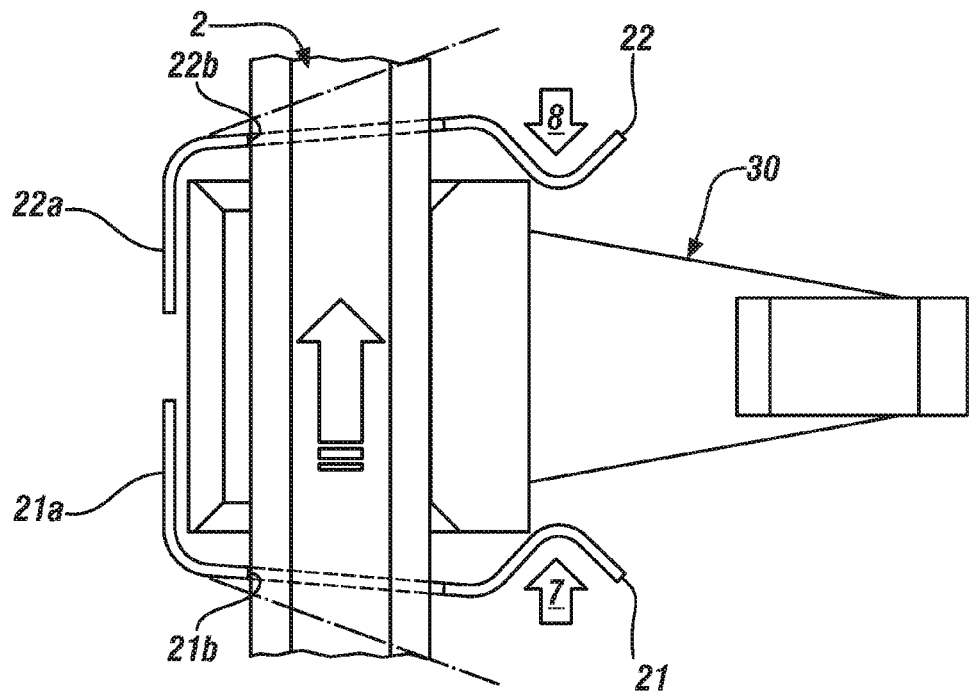
FIG. 5 illustrates a locking device configured for installation according to an exemplary embodiment.
Figure 6:
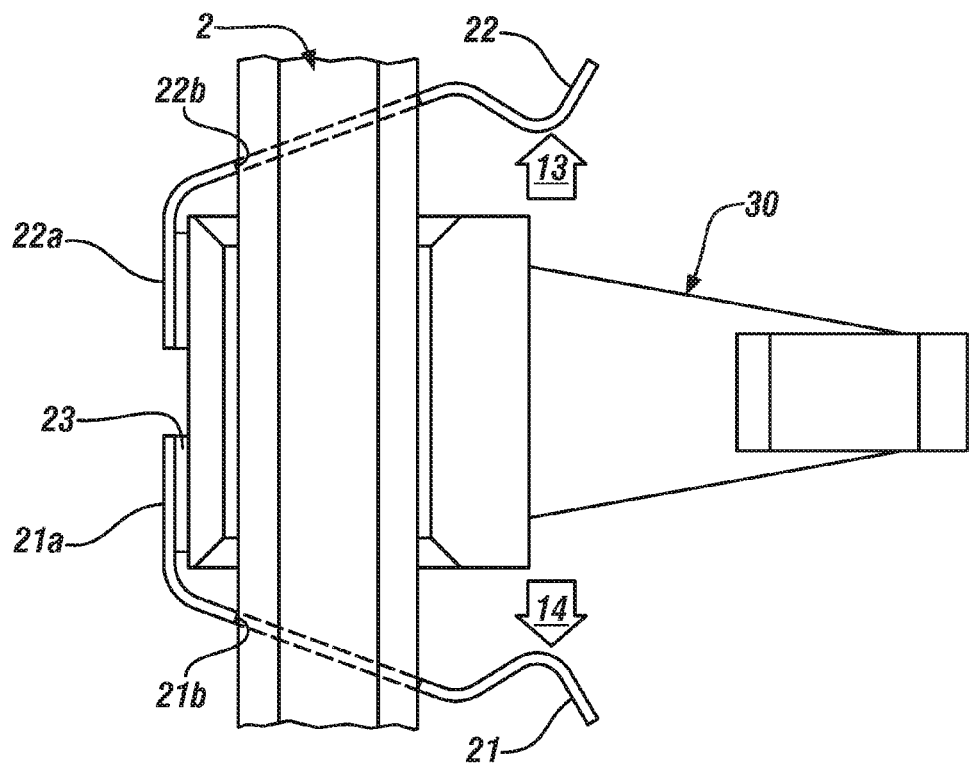
FIG. 6 illustrates a locking device installed on a bolt according to an exemplary embodiment.

FIG. 1 illustrates an exemplary embodiment of the locking device 1. In this exemplary embodiment, the attaching portion 20 of the spring body 10 includes a first wing 21, a second wing 22 and a connecting flange 23. With further reference to FIGS. 5 and 6, the first wing 21 includes a first attachment flange 21a and the second wing 22 includes a second attachment flange 22a. The first wing 21 is spaced from, and connected to, the second wing 22 by way of the connecting flange 23. The first and second attachment flanges 21a, 22a may be formed integrally with or separately from the connecting flange 23. In an embodiment where the connecting flange 23 and first and second attachment flanges 21a, 22a are formed separately, the attachment flanges 21a, 22a may be fixed to the connecting flange with a suitable fastener. For example, each attachment flange 21a, 22a may be fixed to the connecting flange 23 with a bolt, adhesive, weld and/or rivet. It is understood that these fasteners are described for the purposes of example only, and this list is not exhaustive.

The first wing 21 and second wing 22 each project outwardly from the connecting flange 23. In an exemplary embodiment, the first wing 21, in an unloaded condition, projects outwardly from the connecting flange 23 at an angle. The second wing 22, in an unloaded condition, also projects outwardly from the connecting flange 23 at angle. The angle between the first wing 21 and connecting flange 23 and the angle between the second wing 22 and connecting flange 23 may be substantially equal in the unloaded condition, so that the attaching portion 20 of the spring body is generally symmetric. In one exemplary embodiment, the angle between each respective wing 21, 22 and the connecting flange 23 may be obtuse. However, this particular arrangement is only one example of how the spring body may be configured, and is non-limiting. In other exemplary embodiments, the first wing 21 and second wing 22 may be positioned at different angles relative to the connecting flange 23.

The first wing 21 includes a first mounting portion 21b and the second wing 22 includes a second mounting portion 22b. In an exemplary embodiment, the first mounting portion and second mounting portion are provided as openings 21b, 22b formed in the first wing 21 and second wing 22, respectively. The respective openings are shaped such that they are keyed to bolt 2 of the steering column assembly 3 onto which the locking device 1 is mounted. Such an arrangement allows the spring body 10 to rotate with the bolt 2 upon rotation of the bolt 2. In the exemplary embodiment illustrated in FIG. 1, FIG. 5, and FIG. 6, for example, the openings 21b, 22b formed in the first and second wings 21, 22 are generally square in shape, with rounded corners, and match the profile of the bolt 2 onto which to the locking device 1 is mounted.

It is understood, however, that the shape of the openings in the first and second wings 21, 22 and the profile or cross-sectional shape of the bolt 2 are not limited to the generally square example described above. The openings 21b, 22b may be of other suitable shapes, including, but not limited to, generally circular and including a flat portion, oval, rectangular, or other polygonal shapes. The openings 21b, 22b are configured to receive a bolt 2 having a cross-sectional shape or profile corresponding to the shape of the opening, such that the spring body 10 rotates with bolt 2 upon rotation of the bolt 2. However, the cross-sectional shape of the bolt 2 is not limited to a shape which matches the shape of openings. For example, the bolt may have a cross-sectional shape different from the openings 21b, 22b but which still engages the openings and causes the spring body 10 to rotate with the bolt 2. In another example, the openings 21b, 22b may include a recess configured to receive a projection of the bolt 2, such as a spline or splines, so that rotation of the bolt 2 causes rotation of the spring body 10.

With reference to FIGS. 5 and 6, the first and second wings 21, 22 are elastically movable between respective installation positions when an external load is applied thereto, illustrated as arrows 7, 8 in FIG. 5. The first and second wings 21, 22 move to their respective fixing positions when the external load is not applied, as shown in FIG. 6. FIG. 6 illustrates a spring force moving the first and second wings 21, 22 to their respective fixing positions with arrows 12, 14.

FIG. 5 illustrates an exemplary embodiment where an external force, illustrated with arrows 7, 8, is applied to the wings 21, 22 to deflect the first wing 21 to a first installation position and the second wing 22 to a second installation position. In this exemplary embodiment, the angle between each respective wing and the connecting flange 23 is reduced when the external load is applied to move the first and second wings 21, 22 to the respective installation positions. With the first and second wing in the installation positions, the spring body 10 may be moved along a length of the bolt to a desired position. In the installation positions, the respective openings 21b, 22b of the wings 21, 22 are aligned such that the bolt 2 may be received therein and the spring body 10 may slide along the length of the bolt 2.

FIG. 6 illustrates the spring body 10, according to an exemplary embodiment of the present invention, where the first and second wings 21, 22 are in respective fixing positions. Here, the external force is not applied to the wings 21, 22. In the respective fixing positions, sides of the respective openings 21b, 22b frictionally engage the bolt 2 and fix or limit the spring body 10 against movement along the bolt 2. In particular, when the external load is removed for the wings 21, 22, a spring force, illustrated with arrows 13, 14, of each wing urges each wing back to its unloaded position. However, before each wing is completely returned to its unloaded position, the sides of the openings 21b, 22b engage the bolt 2. Thus, the remaining spring force is applied from sides of the respective openings 21b, 22b to the bolt 2, to resist movement of the spring body 10 along the bolt 2.

In an exemplary embodiment, a flat portion formed along a side of each opening comes into contact with a corresponding flat portion of the bolt 2, so that the spring body 10 rotates with the bolt 2.

The biasing portion 30 of the spring body 10 is configured to apply a spring force to the lock body 40 to urge the lock body 40 toward a predetermined position. With further reference to FIG. 1, an exemplary embodiment of the spring body 10 includes the biasing portion 30, which includes a tongue portion 31 and a pressing portion 35.

The tongue portion 31 extends from the connecting flange 23. The tongue portion 31 includes a first, proximate end 32 connected to the connecting flange 23 and a second, distal end 33 opposite to the first end 32. The tongue portion may extend generally between the first wing 21 and second wing 22, although it is understood that the tongue portion may be offset from the first and second wing in at least one direction. In addition, the tongue portion 31 may be integrally formed with the connecting flange 23 or connected to the connecting flange 23 with a suitable fastener.

A pressing portion 35 is connected to the tongue portion at a distal end of the tongue portion 31. The pressing portion 35 is configured to apply a spring force to a portion of the lock body 40 to urge the lock body 40 toward a predetermined position. In an exemplary embodiment shown in FIGS. 1-3, the pressing portion 35 is a leaf spring having a fixed end 36 and a free end 37. In an exemplary embodiment, the fixed end 36 of the pressing portion 35 is formed integrally with the second, distal end 33 of the of the tongue portion 31. However, it is understood that the pressing portion 35 may be formed separately from the tongue portion 31 and attached to the tongue portion 35 using a suitable fastener or fasteners, for example, a bolt, rivet, weld and/or adhesive.

The pressing portion 35 extends in a direction generally away from the tongue portion 31 and in a direction generally away from the second end 33 and toward the first end 32 of the tongue portion 31. That is, in an exemplary embodiment, the tongue portion extends generally a direction from the second end 33 of the tongue portion toward a first end 31 of the tongue portion, and is spaced from the tongue portion 31 by a variable distance. For example, in the exemplary embodiment illustrated in FIG. 1, the pressing portion 35 includes an intermediate segment 38 between the fixed end 36 and free end 37. Here, the free end 37 includes at least a portion that is spaced farther from the tongue portion 31 than the intermediate portion 38 and fixed end 36. With this configuration, the free end 37 of the pressing portion 35 may be elastically deflected toward the tongue portion 31 when a force is applied to the pressing portion 35 in a direction toward the tongue portion 31. The pressing portion 35 exerts a spring force resisting movement toward the tongue portion 31, such that urges the lock body 40 toward the predetermined position when the force is applied and the pressing portion 35 is deflected.

The description of the pressing portion 35 above is for the purposes of example only and is non-limiting. It is understood that the pressing portion 35 may be realized in other configurations and embodiments different from the exemplary embodiment described above. For example, the pressing portion 35 may include a spring other than a leaf spring, such as a coil spring fastened to the tongue portion 31. Alternatively, the pressing portion may include more than one spring.

The connecting flange 23 extends between the first wing 21 and the second wing 22 and spaces the first and second wings 21, 22 from one another. In addition, the tongue portion 31 extends from the connecting flange 23. The connecting flange further includes a stopping surface 24.

In an exemplary embodiment, the connecting flange 23 is substantially rectangular or square in shape. It is understood however that the connecting flange is not limited to this shape alone, and other suitable shapes may be employed as well. For example, the connecting flange 23 may alternatively be another polygonal shape, a circle, U-shaped or H-shaped.

The lock body 40 is configured to lockingly engage and disengage from the component 4 of the steering column assembly 3. For example, the lock body 40 may lockingly engage the EA strap 4 in the steering column assembly 3 to prevent or limit movement or adjustment of the steering column 5 in the telescoping direction.

With reference to FIGS. 1, 3 and 4, in an exemplary embodiment, the lock body 40 is at least partially received between the first wing 21 and second wing 22 of the spring body 10. The lock body 40 includes a body portion 50 and a locking portion 60. The body portion 50 and bolt 2 are configured so that the bolt 2 may rotate relative to the body portion 50 of the lock body 40, for example, when the pressing portion 35 is elastically deflected. The locking portion 60 is configured to lockingly engage and disengage the component 4 of the steering column assembly 3 to control telescoping movement of the steering column 5.

In the exemplary embodiment, the body portion 50 of the lock body 40 includes an opening 51 through which the bolt 2 is received. The opening 51 is shaped such that the bolt 2 may rotate therein relative to the lock body 40. In addition, the spring body 10 may rotate relative to the lock body 40, for example, where the locking portion 60 of the lock body 40 is engaged with a portion of the component 4. Further, the spring body 10 may cause the lock body 40 to rotate together with the lock body 10 and bolt 2, for example, when the locking portion 60 of the spring body is not engaged with any part of the component 4. In one embodiment, the opening 51 of the body portion 50 of the lock body 40 may be circular in shape. However, it is understood that other suitable sizes and shapes of the opening 51 are envisioned as well, which allow the bolt 2 to rotate within the opening 51.

The body portion 50 of the lock body 40 further includes an abutment surface 52 which comes into contact with the stopping surface 24 of the connecting flange 23 when the lock body 40 is rotated to a certain extent in one direction. That is, the abutment surface 52 of the body portion 50 comes into contact with the stopping surface 24 of the connecting flange 23 to limit further rotation of the lock body 40 relative to the spring body 10 in one direction.

The locking portion 60 of the lock body 40 extends from the body portion 50. In an exemplary embodiment, the locking portion 60 is eccentric to the body portion 50. The locking portion 60, at one surface, includes locking teeth 61 formed thereon. The locking teeth 61 are configured to lockingly engage with a corresponding feature 4a formed on the component 4 of the steering column assembly 3. The corresponding feature 4a formed on the component may be, for example, teeth with which the locking teeth 61 of the locking portion 60 engage, or openings which receive the locking teeth 61 of the locking portion 60.

In an exemplary embodiment, the locking portion 60 is formed integrally with the body portion 50. Accordingly, the locking portion 60 rotates together with the body portion 50, such that the lock body 40 rotates as a single unit. Rotation of the lock body 40 in a first direction causes the locking portion 60 to rotate from a first position toward a second position where the locking teeth 61 of the locking portion 60 engage the other component 4 of the steering column assembly 3. Rotation of the lock body 40 in a second direction, opposite to the first direction, causes the locking portion 60 to rotate away from or out of locking engagement with the component 4 of the steering column assembly 3, so as to allow for adjustment of the steering column 5 in a telescoping direction.

With reference to FIGS. 3 and 4, in an exemplary embodiment, another surface 62 of the locking portion 60 is configured to be pressed by the pressing portion 35 of the spring body 10. The pressing portion 35 contacts or engages the surface 62 of the locking portion. Rotation of the bolt 2 causes the spring body 10 to rotate with the bolt 2 in the first direction. Due to the contact between the surface 62 of the locking portion 60 and the pressing portion 35 of the spring body 10, rotation of the spring body 10 causes the locking portion 60, and thus the lock body 10 as a whole, to rotate toward the first position.

With reference to FIG. 3, continued rotation of the bolt 2 and spring body 10, once the locking portion 60 has come into contact with the component 4 of the steering column assembly 3, causes the pressing portion 35 of the spring body 10 to elastically deflect. The elastic deflection of the pressing portion 35 causes an increase in spring force supplied by the pressing portion 35. The spring force may be applied to the locking portion 60 of the lock body 40 to urge the locking teeth 61 into proper locking engagement between the corresponding locking teeth 4a of the EA strap 4, as further discussed below.

With reference to the exemplary embodiments shown in FIGS. 3 and 4, the locking device 1 operates by moving from the unlocked first position, as shown in FIG. 4, to the locked second position. In this embodiment, the corresponding locking apparatus 4a of the component 4 is shown as corresponding locking teeth 4a. The component 4 of the steering column assembly 3 is shown as an EA strap 4.

With the locking device 1 in the unlocked first position, the locking teeth 61 of the locking portion 60 are disengaged from the corresponding locking teeth 4a of the EA strap 4. In this position, the steering column 5 may be adjusted in the telescoping direction. In addition, the abutment surface 52 of the body portion 50 contacts the stopping surface 24 of the connecting flange, to prevent rotation of the lock body 40 relative to the spring body 10 in one direction.

When the steering column 5 is adjusted to the desired position, a user causes the bolt 2 to rotate in the first direction. Rotation of bolt 2 causes the spring body 10, which is keyed to the bolt, to rotate therewith. During rotation of the spring body 10, the pressing portion 35 contacts the surface 62 of the locking portion 60, and thereby rotates the locking portion 60, and thus, the lock body 40 about the bolt 2 with the spring body 10.

In an exemplary embodiment, the steering column 5 is locked against telescopic adjustment when the locking portion is moved to the second position. In the second position, the locking teeth 61 of the locking portion 60 are engaged between the corresponding locking teeth 4a of the EA strap 4.

However, during telescopic adjustment of the steering column 5, the corresponding teeth 4a of the EA strap 4 (or other component in the adjustable steering column) may not be aligned with the locking teeth 61 of the locking portion 60 so that the locking teeth 61 may lockingly engage the corresponding locking teeth.

For example, with further reference to FIG. 3, when a user has adjusted the steering column 5 to a desired position, the user causes the bolt 2 to rotate in a first direction through to move the lock body 40 and locking portion 60 through a first range toward the second position where adjustment is prevented or limited. However, in some cases, the peak areas of the locking teeth 61 of the locking portion 60 may come into contact with peak areas of the corresponding locking teeth 4a of the EA strap 4. In this scenario, because the locking teeth 61 are not engaged between the corresponding teeth 4a of the EA strap, there is no locking engagement which prevents or limits additional telescopic adjustment of the steering column 5.

As discussed above, the pressing portion 35 of the lock body is configured to apply a spring force to the locking portion 60 of the lock body 40. More specifically, when the peak areas of the locking teeth 61 contact the peak areas of the corresponding locking teeth 4a, the bolt 2 and spring body 10 may continue to rotate in the first direction through a second range. However, due to the contact between the respective peak areas of the locking teeth 61 and corresponding locking teeth 4a, the lock body 40 no longer rotates together with the spring body 10 and bolt 2. The continued rotation of the bolt 2 and spring 10 in the first direction, while the lock body 40 does not rotate, causes the pressing portion 35 to elastically deflect. Elastic deflection of the pressing portion 35 increases the spring force applied to the locking portion 60 of the lock body 40. In addition, due to the continued rotation of the bolt 2 and spring body 10, the stopping surface 24 of the connecting flange on the spring body 10 separates from the abutment surface 52 on the body portion of the lock body 40, as shown in FIG. 3.

In the above example, when the pressing portion is deflected, the pressing portion 35 urges the locking teeth 61 of the locking portion 60 toward the second position and into locking engagement. Here, after only slight additional telescopic movement, such that the respective peak areas of the locking teeth 61 and peak areas of the corresponding locking teeth 4a are no longer aligned, the spring force supplied from the pressing portion 35 urges the locking teeth 61 of the locking portion 60 into locking engagement between the corresponding locking teeth 4a of the EA strap 4.

To unlock the locking device 1, and allow for telescopic adjustment of the steering column 5, the user causes the bolt to rotate in the second direction, opposite to the first direction, to move the locking device from the second position to the first position. Here, the pressing portion 35 continues to urge the locking portion 60 of the lock body 40 toward the second position until the pressing portion 35 returns to its undeflected position where the spring force applied to the locking portion 60 is substantially released.

Through the above arrangement, a required preload for variable position of locking engagement and direct disengage may be provided.

With reference to FIGS. 5 and 6, the locking device 1 may be installed in the adjustable steering column 3 using a latch-free connection. In an exemplary embodiment, to install the locking device, the lock body 40 is positioned generally between the first and second wings 21, 22. An external force may be applied to the first wing 21 and second wing 22, such that the first and second wings 21, 22 are elastically deflected toward one another, as shown in the exemplary embodiment of FIG. 5. In this deflected state, the first wing 21 is in the first installation position and the second wing 22 is in the second installation position. With the wings 21, 22 in respective installation positions, the respective openings 21b, 22b in the first and second wings 21, 22, along with the opening 51 in the body portion 50 of the lock body 40 are aligned and provide a clearance sufficient for the spring 10 and lock body 40 to slide along the bolt 2 in the steering column assembly 3. When the locking device 1 is moved to a desired position along the bolt 2, the external force is released from the first and second wings 21, 22, and the first and second wings move toward an unloaded position due a restoring spring force.

The openings 21b, 22b are shaped and configured such that sidewalls of the openings 21b, 22b come into contact with the bolt 2 before the first and second wings are fully returned to their respective unloaded positions. Thus, the spring force restoring the first and second wings 21, 22 toward their unloaded position is applied to the bolt 2 via sidewalls of the openings 21b, 22b, such that sidewalls of the openings 21b, 22b are engaged with the bolt 2. Here, the first wing 21 is in the first fixing position and the second wing 22 is in the second fixing position.

In one embodiment, the openings 21b, 22b include at least one flat portion along a periphery thereof, and the bolt 2 includes at least one flat portion which corresponds to the flat portion of the openings 21b, 22b. Accordingly, the spring body 10 may be keyed to the bolt 2 by way of the corresponding flat portions to rotate together with the bolt 2. This engagement fastens the spring body 10, and hence, the locking device 1 to the bolt 2 in such way to resist further movement along the bolt 2. Accordingly, installation of the locking device may be accomplished without the use of additional components, such as a latching mechanism, to hold the locking device 1 in place along the bolt 2.

During assembly, the locking device may provide a means to de-lash a loose fitting drive. In addition, the locking device provides a sub-assembly of components, which may allow easier system assembly. These functions may be achieved by the locking device while accommodating interfacing system tolerances.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A locking device for a steering column comprising:
   a spring body configured for installation on a rotatable bolt and comprising a biasing portion, the spring body rotable in one direction through a first range and second range; and
   a lock body comprising a body portion configured for mounting on the rotatable bolt and a locking portion configured to move between a first position and a second position, the biasing portion of the spring body contacting the lock body and causing the lock body to rotate with the spring body through the first range, and the spring body rotatable relative to the lock body through the second range, such that at least a portion of the biasing portion is elastically deflected when the spring body is rotated through the second range, wherein the spring body further comprises:
   an elastically deflectable first wing;
   an elastically deflectable second wing;
   a connecting flange connected to both the first wing and second wing and spacing the first wing from the second wing and the first wing comprises an opening formed therein configured to receive the bolt, and the second wing comprises an opening formed therein configured to receive the bolt.

2. The locking device of claim 1, wherein body portion of the lock body comprises an opening formed therein configured to receive the bolt, the openings of the first wing, second wing and lock body are substantially aligned.

3. The locking device of claim 2, wherein the first wing and second wing are configured to deflect upon application of a force in a respective predetermined direction to each wing to allow the spring body to move along the bolt with the bolt received in the respective openings of the first and second wings, and the first and second wing are configured to engage the bolt when the force is released such that the spring body is fixed to the bolt.

4. The locking device of claim 1, wherein the locking portion of the lock body comprises locking teeth configured to selectively engage a corresponding locking component to lock or unlock the locking device.

5. The locking device of claim 1, wherein the biasing portion comprises:
   a tongue portion extending from the connecting flange; and
   a pressing portion extending from one end of the tongue portion, wherein the pressing portion contacts the lock body and is elastically deflectable when the spring body rotates through the second range.

6. The locking device of claim 1, wherein the spring body is configured to rotate together with the bolt.

7. A locking device for a steering column assembly comprising:
   a spring body comprising:
      a connecting flange;
      a first wing including a first opening, the first wing connected to one side of the connecting flange;
      a second wing including a second opening, the second wing connected to another side of the connecting flange, opposite to the one side, the first wing and second wing are elastically deflectable upon application of an external force to the respective wings; and
      a biasing portion extending from the connecting flange, the biasing portion comprising a tongue portion and pressing portion;
   a lock body disposed at least partially between the first wing and second wing, the lock body comprising:

a body portion comprising an opening formed therein, the opening is aligned with the first opening and second opening; and a locking portion connected to the body portion, the locking portion comprising a plurality of locking teeth formed on one surface thereof, the pressing portion contacting another surface of the locking portion during rotation of the of the locking device in at least one direction.

8. The locking device of claim 7, wherein the tongue portion comprises a first end connected to the connecting flange, and a second end, distal to the first end.

9. The locking device of claim 8, wherein the pressing portion comprises a fixed end connected to the second end of the tongue portion and a free end spaced from the tongue portion.

10. The locking device of claim 9, wherein the pressing portion extends in a direction from the second end of the tongue portion toward the first end of the tongue portion, and is spaced from the tongue portion by a variable distance.

11. An adjustable steering column assembly comprising:
a steering column adjustable in at least a telescoping direction;
a rotatable bolt positioned adjacent to the steering column;
a locking device installed on the rotatable bolt; and
a corresponding locking component positioned adjacent to the steering column;
the locking device comprising:
a spring body rotatable with the bolt through a first range and second range, the spring body comprising an installation portion including at least one opening keyed to the bolt and a biasing portion connected to the installation portion, at least a portion of the biasing portion being elastically deflectable;
a lock body positioned adjacent to the installation portion, the lock body comprising a body portion including an opening through which the bolt is received and a locking portion configured to engage the corresponding locking component to lock the steering column against adjustment, and disengage the corresponding locking component to allow for adjustment of the steering column, the lock body rotating with the spring body through the first range due to contact between the lock body and biasing portion, and the portion of the biasing portion being elastically deflected during rotation of the spring body through the second range such that the spring body rotates relative to the lock body through the second range.

12. The locking device of claim 11, wherein the locking portion of the lock body contacts the corresponding locking component during rotation of the spring body through the second range.

13. The locking device of claim 11, wherein the installation portion of the spring body comprises:
a first wing having an opening formed therein;
a second wing having an opening formed therein; and
a connecting flange having the first wing connected to one side thereof and the second connected to another side thereof;
wherein the lock body is positioned at least partially between the first wing and second wing.

14. The steering column of claim 13, wherein the biasing portion comprises a tongue portion having a first end connected to the connecting flange and a second end opposite to the first end.

15. The steering column of claim 14, wherein the biasing portion further comprises a pressing portion having a fixed end connected to the second end of the tongue portion and a free end contacting the lock body, the pressing portion being elastically deflected during rotation of the spring body through the second range.

16. The locking device of claim 11, where the locking portion comprises locking teeth configured to engage and disengage the corresponding locking component.

17. The locking device of claim 16, wherein the corresponding locking component is an EA strap and including a plurality of locking teeth configured to be engaged by the locking teeth of the locking portion.

18. A method of installing a locking device in a steering column, the locking device comprising a spring body and a lock body, the spring body comprising a first wing with an opening, a second wing with an opening, and a connecting flange connected to the first wing and second wing and spacing the first wing from the second wing, the lock body comprising a body portion having an opening extending therethrough and a locking portion, the method comprising:
positioning the lock body between the first wing and second wing;
aligning the opening of the body portion with the openings of the first and second wings;
applying a first force to the first wing to elastically deflect the first wing to a first installation position;
applying a second force to the second wing to elastically deflect the second wing to a second installation position;
positioning the spring body and lock body such that a bolt is received in the opening of the mounting portion of the lock body and the respective opening of the first and second wings;
moving the spring body and lock body along the bolt to a desired position;
releasing the first and second forces from the first wing and second wing respectively.

* * * * *